US008560827B1

(12) United States Patent
Yiftachel et al.

(10) Patent No.: US 8,560,827 B1
(45) Date of Patent: Oct. 15, 2013

(54) AUTOMATICALLY DETERMINING CONFIGURATION PARAMETERS FOR A SYSTEM BASED ON BUSINESS OBJECTIVES

(75) Inventors: Peleg Yiftachel, Hadera (IL); Jehuda Shemer, Kfar Saba (IL); Ido Singer, Nes Ziona (IL)

(73) Assignee: EMC International Company, Hamilton (BM)

( * ) Notice: Subject to any disclaimer, the term of this patent is extended or adjusted under 35 U.S.C. 154(b) by 395 days.

(21) Appl. No.: 12/979,527

(22) Filed: Dec. 28, 2010

(51) Int. Cl.
*G06F 9/00* (2006.01)
*G06F 7/00* (2006.01)
*G06F 17/00* (2006.01)

(52) U.S. Cl.
USPC .......................... 713/100; 707/804; 715/239

(58) Field of Classification Search
USPC ........................................................ 713/100
See application file for complete search history.

(56) References Cited

U.S. PATENT DOCUMENTS

| 6,347,303 | B2 * | 2/2002 | Nagai et al. ................... 705/7.14 |
| 6,981,207 | B1 * | 12/2005 | Bakman et al. ............... 715/210 |
| 7,424,485 | B2 * | 9/2008 | Kristiansen et al. ................ 1/1 |
| 7,924,734 | B2 * | 4/2011 | Pujet et al. ..................... 370/252 |
| 7,949,947 | B2 * | 5/2011 | Frei et al. ....................... 715/239 |
| 8,224,338 | B2 * | 7/2012 | Puthenpura et al. ........... 455/446 |
| 8,250,117 | B2 * | 8/2012 | Olivieri et al. ................ 707/804 |
| 8,311,231 | B2 * | 11/2012 | Monks et al. .................... 381/58 |
| 8,316,347 | B2 * | 11/2012 | Arsanjani et al. ............. 717/105 |
| 2002/0016955 | A1 * | 2/2002 | Matsuo ......................... 717/106 |

* cited by examiner

*Primary Examiner* — Suresh Suryawanshi
(74) *Attorney, Agent, or Firm* — Daly, Crowley, Mofford & Durkee, LLP (57) ABSTRACT

In one aspect, a method includes using a processor to generate system configuration parameters that include using the processor to receive a business input from a user, convert an abstract model into a concrete model based on the business input and optimize the concrete model to solve for system configuration parameters of the system. The abstract model includes a business goal.

20 Claims, 5 Drawing Sheets

AUTOMATICALLY DETERMINING CONFIGURATION PARAMETERS FOR A SYSTEM BASED ON BUSINESS OBJECTIVES

BACKGROUND

Systems are typically designed to allow a user the ability to configure a variety of parameters. These parameters are typically technical and product specific in nature. For instance, in data storage backup, a user may be able to set a level of compression of the data or an amount of bandwidth. Sometimes users do not have a full grasp of how these configuration parameters affect the system or the system performance. Thus, systems may be configured improperly, behave poorly and ultimately incur monetary loss to clients.

SUMMARY

In one aspect, a method includes using a processor to generate system configuration parameters that include using the processor to receive a business input from a user, convert an abstract model into a concrete model based on the business input and optimize the concrete model to solve for system configuration parameters of the system. The abstract model includes a business goal.

In another aspect, an article includes a non-transitory machine-readable medium that stores executable instructions. The instructions cause a machine to receive a business input from a user, convert an abstract model into a concrete model based on the business input and optimize the concrete model to solve for system configuration parameters of the system. The abstract model includes a business goal.

In a further aspect, an apparatus includes circuitry to receive a business input from a user, convert an abstract model into a concrete model based on the business input and optimize the concrete model to solve for system configuration parameters of the system. The abstract model includes a business goal.

DETAILED DESCRIPTION

Described herein is a technique that receives user input based on their business environment or their business goals and determines the appropriate system configuration that will optimize business goals. In this technique the customer defines "what" their business objectives are and the system determines out "how" to (best) meet those business objectives.

While the examples used herein cover replicating data in a replication environment, the techniques described can be used in any type of environment to convert a user's business goals into system configuration parameters. One such replication environment is a continuous data protection environment as described in U.S. Pat. No. 7,774,565, issued Aug. 10, 2010 and entitled, "METHODS AND APPARATUS FOR POINT IN TIME DATA ACCESS AND RECOVERY," which is incorporated herein in its entirety.

The technique herein describes how to derive a goal function for an optimization problem. The goal function indicates how "good" is a solution that an optimization problem solver (e.g., an optimization problem solver module 28 (FIG. 1)) is solving. That is, given two solution instances, solution A and solution B, the goal function determines if the solution A is better or worse than solution B. The optimization problem solver selects the better of the two solutions and continues searching for better solutions until either an optimum is reached, a specific amount of time has elapsed, or a number of iterations has been reached or other stopping criteria.

As such, the goal function's evaluation usually results in a scalar number which makes it easy to define "better." Standard goal functions have terms that are usually derived from a problem domain. For example if one tries to find a best match between two functions, some "distance" measure is used (normally a least sum of square distance of the points). If one is optimizing network traffic then the number of computers that a packet of data has to go through may be minimized (known as number of hops).

As used herein, the system configuration parameters are treated as decision variables which are an output of an optimization problem but the goal function is generated for a different domain (i.e., a business domain). Transformation functions are created which translate business terms that may be unrelated to the systems to technical terms that directly govern the behavior of the system. A set of system constraints which makes sure that the resulting configuration is within technical system or business limitations.

In one example, a user is asked questions like what industry the client is in, type of business, revenue range, types of applications and so forth. The answers to these questions are used to govern bandwidth and compression configurations of a replication system. There is no obvious connection between what data is being asked of the user and what is being done with the data. In this example the data received from the user is used to derive a specialized goal function—a "loss" function—based on money. Thus, the user data is used to place a value on the data the system processes so that the system configuration parameters are optimized using an accounting view. In this example, the user is not exposed to the system internals, but rather, the user answers questions that are in their business domain. Moreover, looking at the wider picture those exact same user input data points can then be used to govern the user data backup systems, high availability infrastructure, and several aspects of storage and SAN configurations. The users business input (i.e., business preferences) can then be reused across other systems or other subsystems further increasing the value gained from the user input. This is possible because the business input is translated into goal functions that are suitable for each system. Each system will then have an optimization problem solver that utilizes this goal function to determine the system configuration parameters.

The result is that the performance of the system is not optimized to get higher utilization or better raw performance; but rather, the system is optimized to get better business value for the user. Thus, there are cases using the techniques described where the resulting performance of the system will be poor if strictly analyzing the performance based on technical aspects but perform amazingly well in terms of minimizing loss or risk.

In a continuous data protection environment, there are competing objectives that require tradeoffs. For example, a recovery point objective (RPO) competes with application latency (LAT). As used herein RPO refers to an acceptable amount of data loss measured in time and the LAT refers to the system response time. In this example the system can slow down its response time which will result in less new data coming from users, thus reducing RPO as less data accumulates. In another example, a protection window (PW) competes with snapshot granularity (SG) and SG competes with target side processing storage size (TSP). PW refers to how far back in time is data protected, for example, the last six months or the last day. SG refers to how often data is backed-up, for example, every second, every minute. TSP refers to the amount of storage needed for storing new data received while accessing an image on the target side. Other objectives in disaster recovery scenarios include a recovery time objective (RTO) which refers to the duration of time till the system data must be restored and the system returns to normal operating conditions after a disaster occurred.

In one example, one could represent the relative importance (e.g., weighting) of these objectives in the trade-offs based on user inputs. For example, Tradeoff 1: $RPO^{0.65}*LAT^{0.35}$
Tradeoff 2: $RTO^{0.5}$
Tradeoff 3: $PW^{0.7}*SG^{0.2}*TSP^{0.1}$ Thus, a goal function, G, can be defined as:

$$G=c_1*RPO^{0.65}*LAT^{0.35}+c_2*RTO^{0.5}+c_3*PW^{0.7}*SG^{0.2}*TSP^{0.1},$$

where $c_1$, $c_2$ and $c_3$ may be constants or derived from the user preferences.

The weights are derived from user preferences. For example, a user that values system performance over RPO will have the LAT weight (currently 0.35) set to a lower value. If a user prefers a longer protection window the user will set the PW weight (currently 0.7) to a higher value at the expense of SG (currently 0.2), for example, values of 0.8 and 0.1 respectively.

Figure 1A:
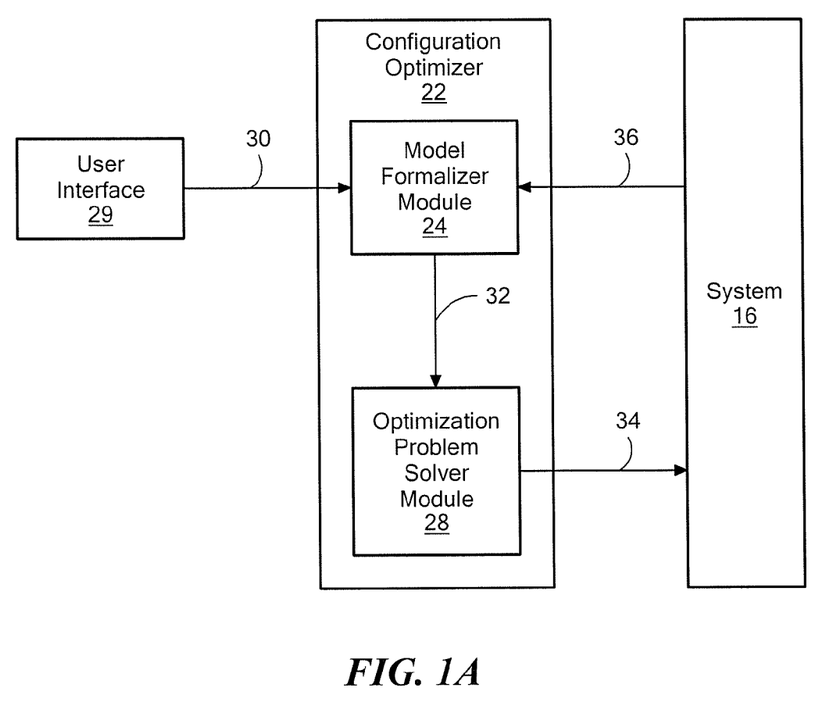
FIG. 1A is a block diagram of an example of a configuration optimizer used to determine system configuration parameters.

Referring to FIG. 1A, a system 10 can be configured by a configuration optimizer 22 by receiving inputs (e.g., business inputs) from a user using a user interface 29 through a connection 30. The configuration optimizer 22 translates the customer's business preferences/goals/environment into system configuration parameters that best meet the customer's business objectives.

In one example, the configuration optimizer 22 determines system configuration parameters at different times such as during system installation or the configuration optimizer is run periodically on a short-term basis to continually adjust the system configuration parameters and/or run periodically on a long-term basis to determine whether or not there is a need for additional resources. For example, in a continuous data protection environment, the configuration optimizer may recommend additional BW, DPAs, storage speed and/or journal size.

The configuration optimizer 22 includes a model formalizer module 24 and an optimization problem solver module 28 connected to the model formalizer module by a connection 32. The model formalizer module 24 converts a predefined abstract model (e.g., a predefined abstract model 72 in FIG. 1B) into a concrete model representing the specific user's business objectives and a state of the system 16.

In one example, the model formalizer module 24 receives the user's input through the connection 30. The model formalizer 24 receives the state of the system 16 through a connection 36. In one example, the inputs from the system 16 are a feedback mechanism to adjust the system configuration parameters over time. In other examples, a feedback loop is not used so that the connection 36 is not included.

The concrete model is optimized by the optimization problem solver module 28 to determine the specific system configuration parameters. In one example, the optimization problem solver 28 may be a standard reusable linear or non-linear tool. In other examples, the optimization problem solver 28 may be domain specific or specially tailored. In further examples, an approximation algorithm may be used if computational complexity is too high. The output of the optimization solver 28 includes the values for the system configuration parameters which are provided to the system 16 manually by the user or automatically through a connection 34.

Figure 1B:
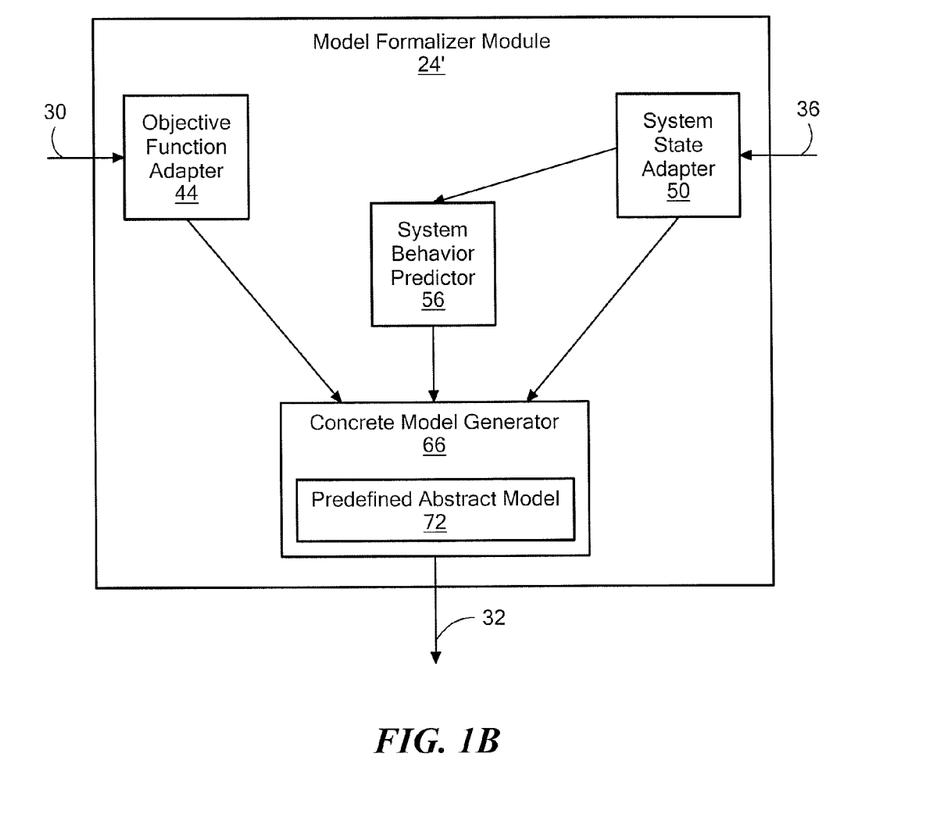
FIG. 1B is a block diagram of an example of a model formalizer module.

Referring to FIG. 1B, in one example, the model formalizer 24 may be a model formalizer 24'. The model formalizer 24' includes an objective function adapter 44, a system state adapter 50, a system behavior predictor 56 and a concrete model generator 66. In other examples, a feedback loop is not used so that the system adapter 50 and the connection 36 are not included. The objective function adapter 44 converts the user's inputs to data for use by the concrete model generator 66. The system state adapter 50 provides the state of the system to the system behavior predictor 56 and the concrete model generator 66. The system behavior predictor provides to the concrete model generator 66 a prediction of the state of system 16 in the future. The concrete model generator 66 includes a predefined Abstract Model 72. In one example, the abstract model is:

$$G=a*x^2+b*x*y+c*y^2,$$

where a, b and c are constants and x and y are variables representing system configuration parameters. G represents a business goal that is to be optimized. Based on inputs from the objective function adapter 44, the system behavior predictor 56 and the system state adapter 50, the constants in the Abstract model, for example, a, b and c in the example, are known so that the concrete model generator 66 provides a concrete model to the optimization problem solver module 28 through the connection 32 to solve for the variables x and y that represent the system configuration parameters.

Figure 2:
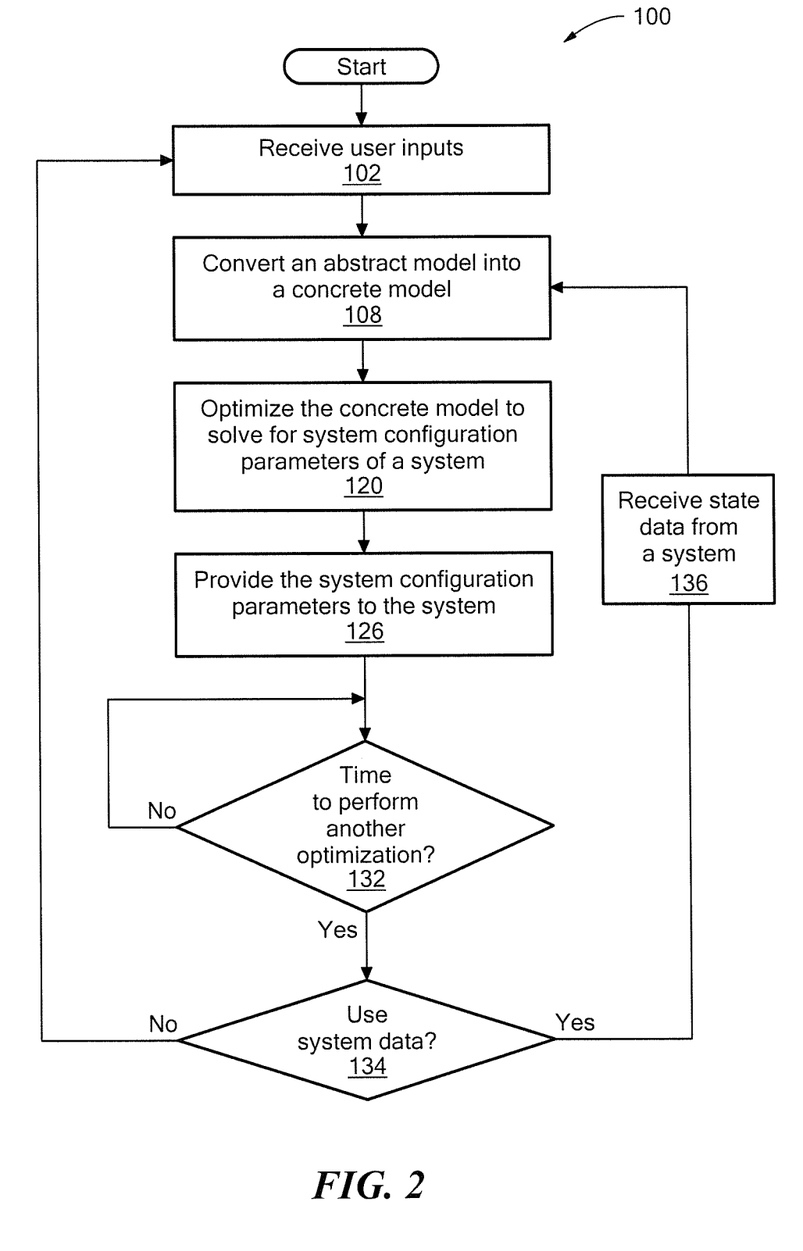
FIG. 2 is a flowchart of an example of a process to determine system configuration parameters.

Referring to FIG. 2, a process 100 may be used to convert a user's inputs into system configuration parameters. Process 100 receives inputs from a user (102). For example, a user may indicate peak operating hours, when the busy season occurs, a recovery time objective, type of industry and/or current government regulations that govern their business activity. For example, the user inputs are received at the objective function adapter 44. In other example, the user may specify an RPO for critical data and another RPO for regular data.

Process 100 converts an abstract model into a concrete model (108). For example, concrete mode generator 66 tailors the predefined abstract model 72 to a concrete model based on the specific user needs and the actual system based on the user inputs received from the objective function adapter 44, the system state data received from the system state adapter 50 and the anticipated system performance received from the system behavior predictor 56.

In one example, the concrete model may be implemented to include an optimizer that is a linear optimizer and a concrete model generator 66 (FIG. 1B) that is a linear concrete model generator. In this example implementation, the concrete model includes at least four characteristics. First, the concrete model is a measurable objective function that is formulated in terms of weighted business factors based an analysis of the customer's business preferences. Second, the concrete model includes decision variables, which represent the system configuration parameters. The system configuration parameters are determined by the optimization problem solver module 28 and therefore may be hidden from the user, thereby simplifying the configuration process. Third, the concrete model includes functions that map the system configuration parameters to the business factors, which can be accomplished by mathematical observations and/or statistical analysis. Fourth, the concrete model includes constraints, which represent configuration limitations of the system 16 that may include (but are not limited to) total bandwidth, available memory, available CPU resources, number of appliances, number of network connections and so forth.

Process 100 optimizes the concrete model to solve for the system configuration parameters (120). Process 100 provides the system configuration parameters to the system 16 (126). For example, the optimization problem solver module provides the system configuration parameters through the connection 34 to the system. In one example, in a replication environment, system configuration parameters of the system may include at least one of preferred data protection appliances (DPAs), journal compression, snapshot consolidation policy, image access log size, bandwidth allocation and compression levels.

Process 100 determines if it is time to perform another optimization (132), for example, to update the system configuration parameters based on the system behavior. If it is time for another optimization, process 100 will determine if system data will be used (134). If system data is not used, the process 100 repeat processing blocks 106 to 132.

If system data is used, the process 100 receives state data from the system (136). For example, the state data is received at the system adapter 50. The system data may, for example, include any settings, status and statistics information that may influence the behavior of the concrete model. Processing block 108 is repeated except processing block 108 includes the state data. For example, the concrete model generator 66 tailors the predefined abstract model 72 to a concrete model based on the specific user needs and the actual system state based on the user inputs received from the objective function adapter 44, the system state data received from the system state adapter 50 and the anticipated system performance received from the system behavior predictor 56.

The use of the system state feedback allows one to repeatedly compare the targeted business goal (the value of the goal function that the best solution was supposed to achieve) and reality, to make sure that the analysis does not diverge from reality. This can happen because the mathematical model (the abstract model) was simplistic or because the running environment changed (errors, power outages, disasters, load from other systems on shared resources etc). Using feedback allows the user to re-evaluate the system in its new context and reconfigure the system to make the best business value under the new conditions.

In one particular example, in the continuous data protection environment, the abstract model is define as:

$$BW_1, \stackrel{Min}{\ldots} BW_N \left\{ \sum_{i=1}^{N} Loss_i(PRPO_i) \right\}$$

where:

$PIT_i = CIT_i$ $PRPO_i = CRPO_i + (PIT_i \cdot PCR_i - BW_i) \cdot \Delta t$ such that:

$$\sum_{i=1}^{N} BW_i = BW \text{ LIMIT}$$

$$0 \le BW_i \le \frac{CRPO_i}{\Delta t} + PIT_i \cdot PCR_i$$

and where $\Delta t$ is the time between evaluations of the model, RPO is an amount of data that is not delivered to the replica storage. Here it defined in data units (rather than time units), CRPO is the current RPO, PRPO is a predicted RPO for the coming $\Delta t$, CIT is a Current Incoming Throughput, PIT is a predicated Incoming Throughput for the period of $\Delta t$, $BW_i$ is a bandwidth allocation for the application i, $Loss_i(RPO)$ is a monetary loss due to unprotected data in case of a disaster and PCR is a predicted compression ratio received as feedback $$\frac{\text{size after compression}}{\text{size before compression}}.$$

In this example it is assumed that the output bandwidth does not change between evaluations (i.e., it is a constant), an ideal network (no drops) and compression level is fixed.

Figure 3:
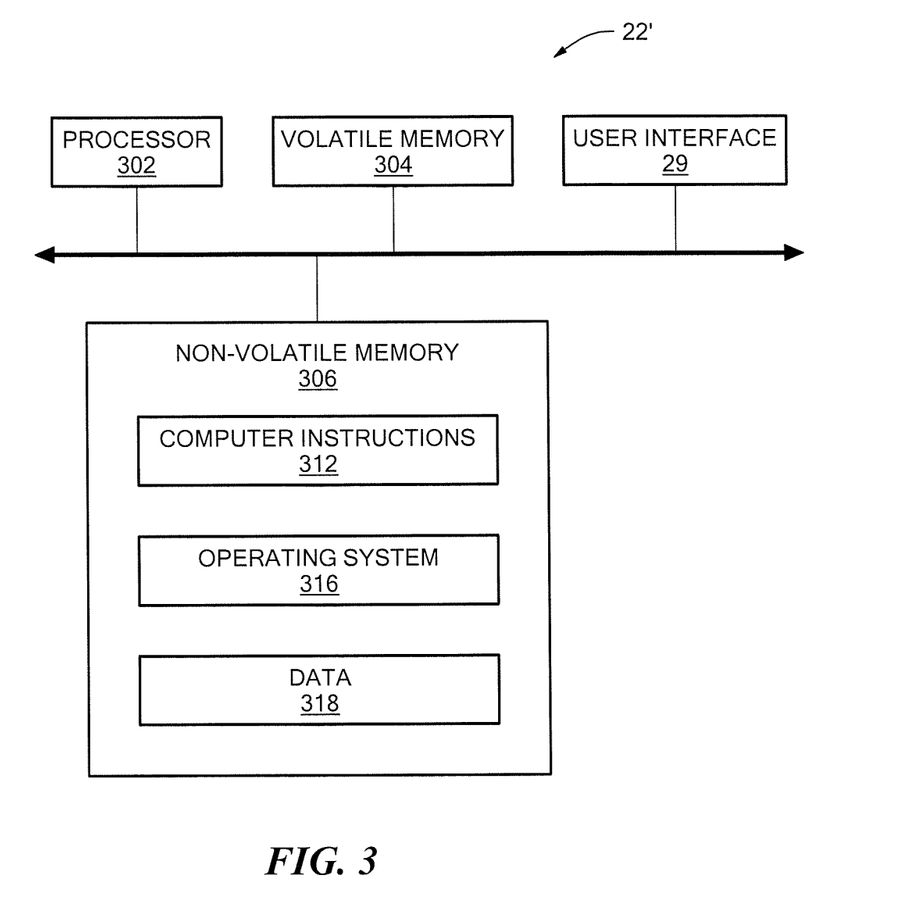
FIG. 3 is a computer on which any of the process of FIG. 2 may be implemented.

Referring to FIG. 3, in one example, the configuration optimizer 22 is represented by a computer 22'. The computer 22' includes a processor 302, a volatile memory 304, a non-volatile memory 306 (e.g., hard disk) and a user interface (UI) 29 (e.g., a mouse, a keyboard, a display, touch screen and so forth). The non-volatile memory 306 stores computer instructions 312, an operating system 316 and data 318. In one example, the computer instructions 312 are executed by the processor 302 out of volatile memory 304 to perform all or part of the processes described herein (e.g., process 100).

The processes described herein (e.g., process 100) are not limited to use with the hardware and software of FIG. 3; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

Figure 4:
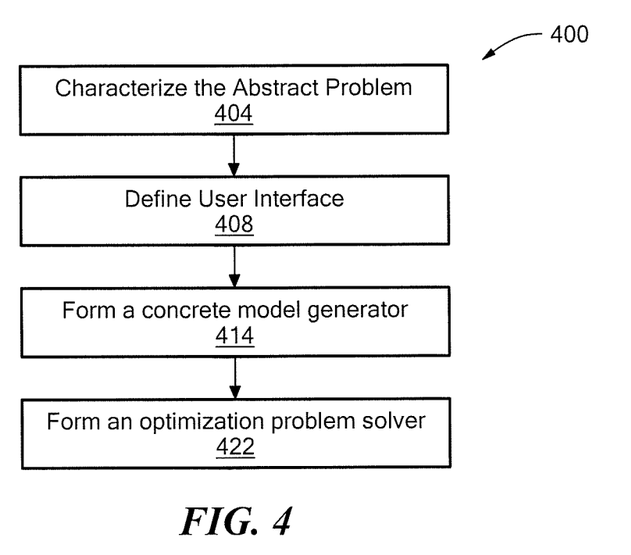
FIG. 4 is a flowchart of an example of a process to generate the configuration optimizer of FIG. 1.

Referring to FIG. 4, an example of a process to generate the configuration optimizer 22 is a process 400. Process 400 characterizes the abstract optimization problem (404) (as described in FIG. 5).

Process 400 defines the user interface (e.g., the user interface 29) (408). For example, the purpose of the user interface is to determine the user's intent and to determine a context and environment of the user's intent. For every parameter that cannot get its value derived from system metrics/settings/state, what business data is needed is defined in order to derive values. This business data may be general company/sector/system data; application revenue/costs/loss, usage or other monetary information; statistical or other data regarding other systems that interact with this system; priorities or weights between groups, applications, sub-components or systems; strategic or tactical preferences like reduce cost, increase revenue, increase units sold, more new customers, decrease MTBF; and algebraic notation of the goal function if it is available.

These user interface elements are preferably in the business domain thus closer to the way the user views the world. This allows deriving the effects of the terms in the goal function on the user's intent. The effect may be the monetary loss, legal/regulative or insurance implications, and operational implications. These effects can be used to derive the parameters of the abstract model.

Alternatively the user interface may be modified to support a subject matter expert that will be given different parameters or may even supply the terms of the goal function or even the goal function itself directly to the system.

Process 400 forms the concrete model generator 66 (414). The abstract model described herein includes a parameterized goal function and a parameterized conversion function set. The inputs needed to the system in order to give values to these coefficients and create concrete instances of the model are defined. These inputs are derived from either from current system metrics/settings/state or from user input. The purpose of the concrete model generator module 66 is to concretize the objective function and to concretize the conversion function. Concrete model generator 66 therefore derives actual functions and parameter values for the goal function; creates instances of all functions and terms dependant on user input and actual system metrics/settings/state and sets the parameters of these instances from derived user input data or system metrics/settings/state.

Process 400 forms the optimization solver 28. An optimization problem solver is chosen based on its suitability to solve the concrete problem. The optimization problem solver can be a linear or non-linear tool, it may be domain specific or specially tailored, an approximation algorithm and so forth. The choice also considers hardware resources available (memory, CPU) and the amount of time available in order to solve the optimization problem.

Figure 5:
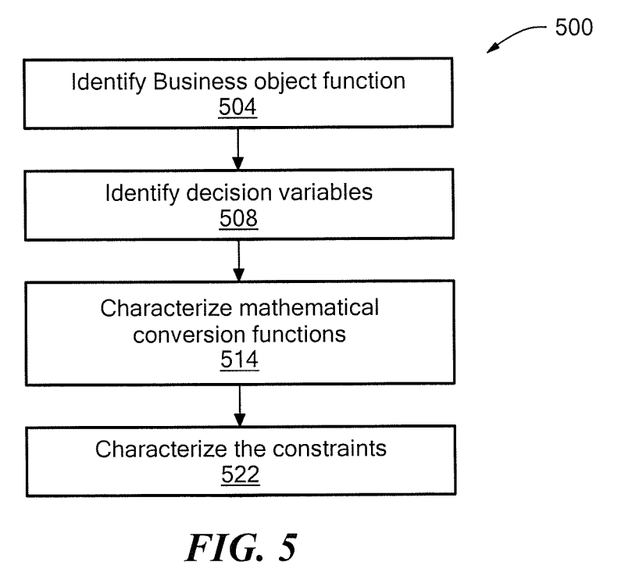
FIG. 5 is a flowchart of an example of a process to characterize an abstract optimization problem.

Referring to FIG. 5, an example of a process to characterize the abstract optimization problem is a process 500. Process 500 identifies the business objective function (504). For example, how terms of the goal function are defined and how the terms of the goal function are combined.

The terms of the goal function may be any business objective. For some terms a monetary value can be assigned thus if there are multiple unrelated goals to optimize, optimizing the monetary loss/gain is good option. Other options may include optimizing head count, processing time, time to market/delivery, reduction of item counts or purchased item counts, warehouse storage volume/inventory, backlog, MTBF, support calls etc Other examples include imposing physical limitations (such as maximal storage volume or storage weight limitations) needed by the user to be directly optimized or have constraints added to impose these limitations. There may be separate terms for different groups, applications, sub-components or systems.

Combining goal terms may be performed in an abstract (parameterized) fashion. For example, if the terms are to be linearly combined then the combination coefficients are given as parameters. In another example, the abstract function may include powers or other functions, unit transformations or weighting/priority functions. In a further example, some terms may be used by translating into their monetary equivalents and then combining these.

Process 500 identifies the decision variables (508). For example, these decision variables are the system configuration parameters whose values will be determined by the system.

Process 500 characterizes mathematical conversion functions (514). Functions (e.g., parameterized functions) that connect technical system properties (metrics/settings/state) to the affected business term are created. These functions may be analytical functions if the relation between the technical entities and the business entities is well understood. Examples of other functions include statistical or empirical functions, approximations, and functions from academic research.

The decision variables are inputs to these functions. These functions may include predictor elements to help simplify their algebraic form. If the value of the business term is dependent on unknown system run-time input, some guess of the expected input can be used. Otherwise averages or other statistics may be used.

So in general the function looks like this:

term=f(DecisionVar$_1$, . . . , DecisionVar$_n$, SystemProperty$_i$, . . . , SystemProperty$_k$, PredictedValues$_1$, . . . PredictedValues$_m$)

Process 500 characterizes the constraints (522). The constraints may include any one or more of system hardware limitations, business limitations, environment limitations and so forth.

In some examples, the UI 29 is a graphical user interface (GUI) (not shown) that may be configured to enable the user to do "what-if" analysis prior to committing changes to the system 16. In one particular example, the GUI is configured to include a slide-bar (not shown) that will be enabled by the user to receive feedback as to what the expected impact is on the application and other applications in the system 16 if certain changes are made, for example, to the system configuration parameters. The feedback will be generated by comparing the current configuration and the new configuration that is the result of the optimization algorithm. In one particular example, the configuration settings may not be applied automatically to the system 16 but rather the user changes the configuration to receive insight as to the effect on the system by the configuration optimizer.

The processes described herein are not limited to the specific examples described. For example, the processes 100, 400 and 500 are not limited to the specific processing order of FIGS. 2, 4 and 5. Rather, any of the processing blocks of FIGS. 2, 4 and 5 may be re-ordered, combined or removed, performed in parallel or in serial, as necessary, to achieve the results set forth above.

The processing blocks in FIG. 2 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
   using a processor to generate system configuration parameters of a system comprising using the processor to:
   receive a business input from a user;
   with the business input convert an abstract model into a concrete model based on inputs from an objective function adapter, a system behavior predictor and a system state adapter, the abstract model comprising a business goal; and
   optimize the concrete model to solve for the system configuration parameters of the system.

2. The method of claim 1 wherein using the processor to generate the system configuration parameters further comprises using the processor to receive state data from the system, and
   wherein using the processor to convert the abstract model comprises using the processor to convert an abstract model into a concrete model based on the business input and the state of the system.

3. The method of claim 1, further comprising using the processor to recommend additional system resources based on the optimized concrete model.

4. The method of claim 1 wherein using the processor to receive state data from a system comprises using the processor to receive state data from a system in a replication environment.

5. The method of claim 4 wherein using the processor to optimize the concrete model to solve for system configuration parameters of the system comprises using the processor to optimize the concrete model to solve for system configuration parameters of the system comprising at least one of preferred data protection appliances (DPAs), journal compression, snapshot consolidation policy, image access log size, bandwidth allocation and compression levels.

6. The method of claim 4, further comprising using the processor to recommend additional system resources based on the optimized concrete model, the additional resources comprising at least one of bandwidth (BW), data protection appliances (DPAs), storage speed or journal size.

7. The method of claim 1 wherein using the processor to generate system configuration parameters comprises using the processor periodically to generate the system configuration parameters.

8. The method of claim 1 using the business input from the user to configure more than one different system.

9. An article comprising:
   a non-transitory machine-readable medium that stores executable instructions, the instructions causing a machine to:
   receive a business input from a user;
   with the business input convert an abstract model into a concrete model based on inputs from an objective function adapter, a system behavior predictor and a system state adapter, the abstract model comprising a business goal; and
   optimize the concrete model to solve for system configuration parameters of a system.

10. The article of claim 9 wherein the instructions to generate the system configuration parameters further comprises instructions to receive state data from the system, and
    wherein the instructions to convert the abstract model into the concrete model comprises instructions to convert an abstract model into a concrete model based on the business input and the state of the system.

11. The article of claim 9, further comprising instructions to recommend additional system resources based on the optimized concrete model.

12. The article of claim 11 wherein the instructions to optimize the concrete model to solve for system configuration parameters of the system comprising at least one of preferred data protection appliances (DPAs), journal compression, snapshot consolidation policy, image access log size, bandwidth allocation and compression levels.

13. The article of claim 11, further comprising instructions to recommend additional system resources based on the optimized concrete model, the additional resources comprising at least one of bandwidth (BW), data protection appliances (DPAs), storage speed or journal size.

14. The method of claim 1, further comprising enabling the user to receive feedback as to what the expected impact is on the application and other applications in the system.

15. An apparatus, comprising:
    circuitry to:
    receive a business input from a user;
    with the business input convert an abstract model into a concrete model based on inputs from an objective function adapter, a system behavior predict and a system state adapter, the abstract model comprising a business goal; and
    optimize the concrete model to solve for system configuration parameters of a system.

16. The apparatus of claim 15 wherein the circuitry comprises at least one of a processor, a memory, programmable logic and logic gates.

17. The apparatus of claim 15 wherein the circuitry to generate the system configuration parameters further comprises circuitry to receive state data from the system, and
    wherein the circuitry to convert the abstract model into the concrete model comprises circuitry to convert an abstract model into a concrete model based on the business input and the state of the system.

18. The apparatus of claim 15, further comprising circuitry to recommend additional system resources based on the optimized concrete model.

19. The apparatus of claim 18 wherein the circuitry to optimize the concrete model to solve for system configuration parameters of the system comprising at least one of preferred data protection appliances (DPAs), journal compression, snapshot consolidation policy, image access log size, bandwidth allocation and compression levels.

20. The apparatus of claim 18, further comprising circuitry to recommend additional system resources based on the optimized concrete model, the additional resources comprising at least one of bandwidth (BW), data protection appliances (DPAs), storage speed or journal size.

\* \* \* \* \*